United States Patent [19]
Willemsen

[11] 3,832,113
[45] Aug. 27, 1974

[54] DEVICE FOR THE MANUFACTURE OF SMALL STICKS OF DOUGH-LIKE MATERIAL

[76] Inventor: Willem Hendrik Willemsen, Westervalge 83, Warffum, Netherlands

[22] Filed: Aug. 15, 1972

[21] Appl. No.: 280,748

[30] Foreign Application Priority Data
June 6, 1972 Netherlands.................... 7207636

[52] U.S. Cl.............................. 425/311, 425/313
[51] Int. Cl............................................ A21c 11/18
[58] Field of Search ........... 425/311, 313, 464, 310, 425/382; 83/620, 622, 651.1, 926 B

[56] References Cited
UNITED STATES PATENTS
| | | | |
|---|---|---|---|
| 817,352 | 4/1906 | Walstead | 425/311 |
| 1,955,342 | 4/1934 | Pizzini et al. | 425/311 X |
| 2,351,493 | 6/1944 | Curry | 425/311 X |

FOREIGN PATENTS OR APPLICATIONS
| | | | |
|---|---|---|---|
| 9,574 | 9/1927 | Australia | 425/311 |

Primary Examiner—J. Spencer Overholser
Assistant Examiner—David S. Safran
Attorney, Agent, or Firm—Karl W. Flocks

[57] ABSTRACT

A device for the manufacturing of small sticks of dough-like material having different dimensions and different shapes by pressing said dough-like material out of a container having a bottom plate provided with at least one aperture subdivided by ribs into slots of different dimensions and shapes. Cutting means being provided under said plate for cutting off the dough-like material pressed through said slots by means of a piston arranged in said cylinder.

1 Claim, 2 Drawing Figures

DEVICE FOR THE MANUFACTURE OF SMALL STICKS OF DOUGH-LIKE MATERIAL

This invention relates to a device for the manufacture of small sticks of dough-like material and aims at providing a device of this type with which it is possible to manufacture small sticks of different lengths and shapes.

Similar devices are generally known and are used for pressing dough formed from potatoes or the like material into small sticks which after having been fried in oil produce the so-called French fries.

In said known devices by means of a piston the dough is forced out off a cylinder provided with a bottom plate provided with a big number of apertures having a small square corss-section defining the cross-section of the sticks. After having reached a predetermined length the material forced out off the cylinder in strip-shape is cut off by cutting means disposed below said plate. All of the small sticks obtained in this way have the disadvantage that they have the same length and shape and therefore they differ from the small sticks formed from potatoes as such which sticks have more irregular dimensions and shapes.

In order to obtain small sticks of different lengths and also of different shapes, according to the invention said cylinder is provided at one of its ends with a plate having one or more apertures of round, oval or other shape, ribs being provided in said or each aperture subdividing the or each aperture into slots of different dimensions and shapes, a piston being provided in said cylinder for pressing said dough-like material through said slots out off said cylinder, cutting means being arranged under said slots for cutting off the material pressed through said slots, all this in such a way, that small sticks are obtained having their longest dimension horizontally when being cut off.

The ends of the small sticks are not exactly straight and one also produces small sticks presenting lengths of arc. As a result after having been fried a helping of French fries includes different small sticks as are produced if one starts from potatoes as such.

In order to obtain small sticks which are slightly compressed on two opposite sides, which is favourable for the production of sticks having satisfactory frying properties, it is preferred for the slots to narrow towards the outlet of the tube sections.

In a preferred embodiment of the device according to the invention the plate comprises three apertures arranged symmetrically on the surface of the plate and being surrounded at the underside of the plate by a tube section in which ribs are provided subdividing said apertures into slots of different dimensions and shapes and that for cutting off the forced-out pieces of dough two parallel spaced wires are provided, one wire being shorter than the other wire, said shorter wire serving to cut off the material emerging from one tube section and the longer wire serving to cut off the material emerging from the two other tube sections.

The invention is explained below with reference to the accompanying drawings showing by way of example an embodiment of the device according to the invention.

Figure 1:
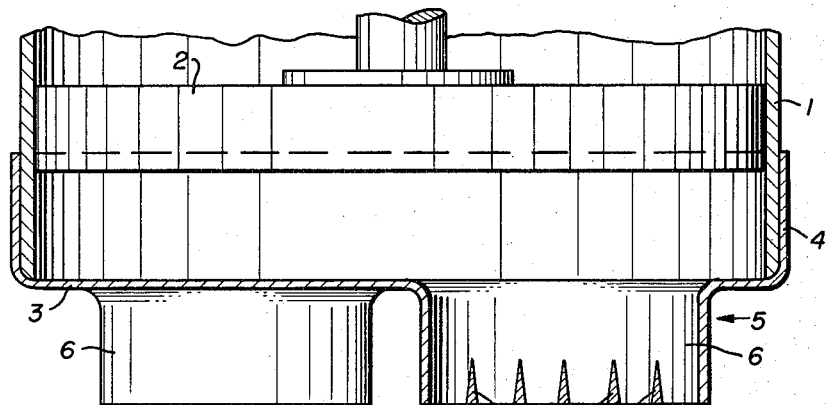
FIG. 1 shows a diagrammatical longitudinal section of an embodiment of the device according to the invention.

In FIG. 1 reference numeral 1 denotes a cylindrical sleeve in which a piston 2 is arranged. The sleeve is supported by a plate 3 having an upright rim portion 4.

The sleeve 1 and the piston 2 with the plate 3 supporting the sleeve are common devices and the construction including fastening means and means for moving the piston up and down will not be further described.

The invention relates to the construction of the plate 3 which differs from the plates used so far.

Figure 2:
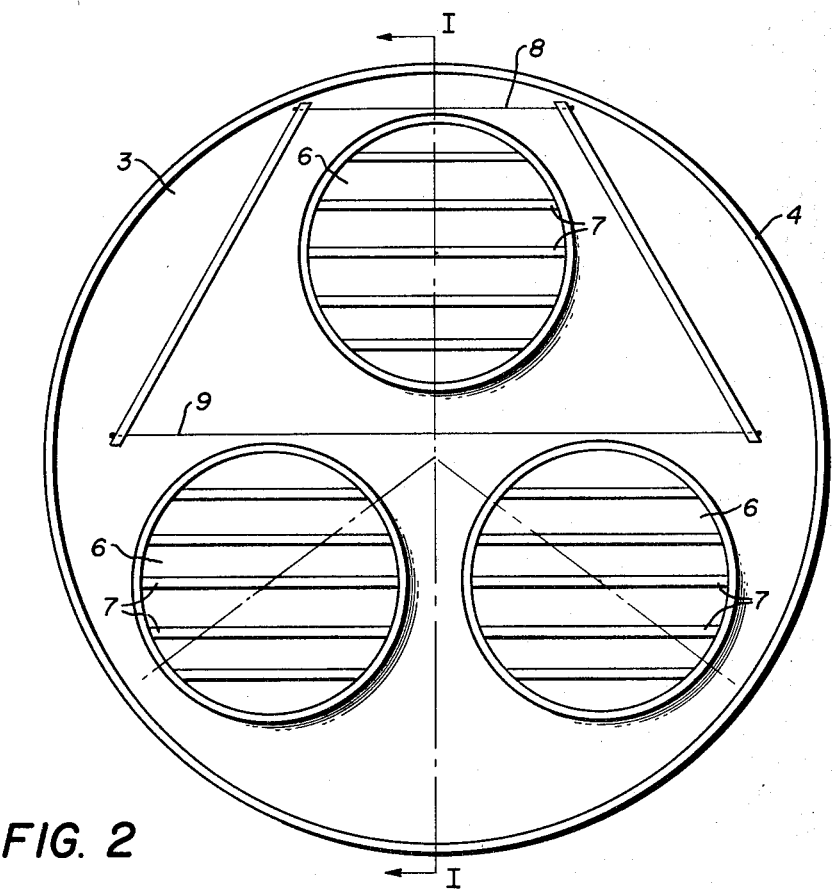
FIG. 2 shows a top plan view of the pressing plate belonging to the device according to FIG. 1.

FIG. 2 shows a top plan view of the plate 3 and FIG. 1 is, as regards the plate, a section according to the line I—I of FIG. 2.

In the plate 3 there are provided three round apertures 5 each of said apertures opening downwardly into a tube section 6.

Near the lower end of the tube sections thin ribs 7 are provided.

When the dough is pressed by the piston 2 out of the cylinder 1 said dough is pressed through the tube sections 6 and is divided therein by the ribs 7 into strips of different length, two strips of the smallest length being bounded by a circular arc. Viewed in FIG. 2 the strips bounded by a circular arc are those which are forced out at the upper and the lower side of the apertures 5.

The dough is pressed out down to a distance of about 10 mm. from the lower end of the tube sections 6 and is subsequently cut off by rotatably arranged knives in the form of wires 8 and 9. Thus one obtains small sticks which when being cut off are positioned with their longest dimension horizontally and not vertically as so far has been usual practice.

In order to arrive at a compression of the dough at the sides of the small sticks the strips 7 are given the shape of ribs with a triangular cross-section the apex of which is pointing upwards. The slots between the strips therefore narrow towards the lower end of the tube sections 6, as shown in FIG. 1. It has been found that as a result of being slightly compressed the small sticks absorb less oil during the frying process.

It is obvious that the invention is not restricted to the embodiment described above by way of example and shown in the drawings but that it may be modified in many ways without departing form the scope of the invention. The aperture may have different dimensions and may also be round or oval with an irregularly shaped circumference. The slots may be of a different width and the cross-section of the ribs 7 may also be rectangular or it may have the shape of a triangle with legs of different length. In stead of a plate having three apertures said plate may also have only one aperture having a diameter substantially equal to the diameter of the cylinder. The slots in said aperture formed by ribs 7 may be subdivided themselves by cross ribs. In stead of a plate having apertures opening into tube sections a plate may be used having a thickness substantially equal to the height of the tube sections.

I claim:

1. A device for the manufacture of small sticks of dough-like material, said device comprising a cylinder for receiving said dough-like material, said cylinder having at one of its ends a plate provided with three apertures, each of said apertures opening into a tube section, ribs being arranged in said tube section providing said tube section with slots of different dimensions and different shapes having their longest dimension horizontal, a piston being arranged in said cylinder for pressing said dough-like material through said tube sections and through said slots out of said cylinder, horizontally movable cutting means being arranged under said slots for cutting off the material pressed-out through said slots, said cutting means comprising two parallel spaced wires, one of said wires being shorter than the other wire, said shorter wire serving to cut off the material emerging from one tube section and the longer wire serving to cut off the material emerging from the two other tube sections.

* * * * *